United States Patent
Swaans et al.

(10) Patent No.: US 9,438,315 B2
(45) Date of Patent: Sep. 6, 2016

(54) WIRELESS POWER ADAPTER

(71) Applicant: ConvenientPower HK Ltd., Hong Kong (CN)

(72) Inventors: Laurens Henricus Swaans, Hong Kong (CN); Xun Liu, Hong Kong (CN); Chun Kit Chu, Hong Kong (CN)

(73) Assignee: ConvenientPower HK Ltd., Hong Kong (CN)

( * ) Notice: Subject to any disclaimer, the term of this patent is extended or adjusted under 35 U.S.C. 154(b) by 246 days.

(21) Appl. No.: 14/323,941

(22) Filed: Jul. 3, 2014

(65) Prior Publication Data

US 2016/0006484 A1    Jan. 7, 2016

(51) Int. Cl.
*H04B 5/00* (2006.01)
*H02J 5/00* (2016.01)

(52) U.S. Cl.
CPC ............ *H04B 5/0037* (2013.01); *H02J 5/005* (2013.01); *H04B 5/0075* (2013.01)

(58) Field of Classification Search
CPC ...................................................... H02J 5/005
IPC ...................................................... H02J 5/005
See application file for complete search history.

(56) References Cited

U.S. PATENT DOCUMENTS

| | | | |
|---|---|---|---|
| 5,963,012 A | 10/1999 | Garcia et al. | |
| 6,118,249 A | 9/2000 | Brockmann et al. | |
| 6,301,128 B1 | 10/2001 | Jang et al. | |
| 6,356,049 B2 | 3/2002 | Oguri | |
| 6,396,241 B1 | 5/2002 | Ramos et al. | |
| 6,501,364 B1 | 12/2002 | Hui et al. | |
| 7,164,255 B2 | 1/2007 | Hui | |
| 7,915,858 B2 | 3/2011 | Liu et al. | |
| 8,299,753 B2 | 10/2012 | Hui | |
| 8,519,668 B2 | 8/2013 | Hui | |
| 2001/0003416 A1 | 6/2001 | Kajiura | |
| 2003/0210106 A1 | 11/2003 | Cheng et al. | |
| 2009/0121675 A1 | 5/2009 | Ho et al. | |
| 2012/0010079 A1 | 1/2012 | Sedwick | |

FOREIGN PATENT DOCUMENTS

| | | |
|---|---|---|
| CN | 102347643 A | 2/2012 |
| CN | 102947124 A | 2/2013 |
| CN | 103326406 A | 9/2013 |
| GB | 2 388 716 A | 11/2003 |
| GB | 2 389 720 A | 12/2003 |
| GB | 2 389 767 A | 12/2003 |

(Continued)

OTHER PUBLICATIONS

PCT Written Opinion, PCT Application No. PCT/CN2015/078857, Jul. 29, 2015, 3 pages.

(Continued)

*Primary Examiner* — Robert Deberadinis
(74) *Attorney, Agent, or Firm* — Fenwick & West LLP (57) ABSTRACT

A wireless power adapter includes a receiver coil system, a transmitter coil system and a conversion stage. The receiver coil system is compatible with a specification and can efficiently receive wireless power transmitted by a transmitter compliant with that specification. The transmitter coil system is compatible with a different specification and can produce wireless power to be efficiently transmitted to a receiver compliant with that specification. The conversion stage converts between the two specifications.

26 Claims, 5 Drawing Sheets

(56) References Cited

FOREIGN PATENT DOCUMENTS

| | | |
|---|---|---|
| GB | 2 392 024 A | 2/2004 |
| GB | 2 398 176 A | 8/2004 |
| GB | 2 399 225 A | 9/2004 |
| GB | 2 399 230 A | 9/2004 |
| GB | 2 399 446 A | 9/2004 |
| WO | WO 03/105308 A1 | 12/2003 |
| WO | WO 2004/038888 A2 | 5/2004 |
| WO | WO 2007/019806 A1 | 2/2007 |

OTHER PUBLICATIONS

Hui, S. Y. R. et al., "A New Generation of Universal Contactless Battery Charging Platform for Portable Consumer Electronic Equipment," IEEE Transactions on Power Electronics, May 2005, pp. 620-627, vol. 20, No. 2.

Sekitani, T. et al., "A Large-Area Flexible Wireless Power Transmission Sheet Using Printed Plastic MEMS Switches and Organic Field-Effect Transistors," IEDM 2006, International Electron Devices Meeting, Dec. 2006, pp. 1-4.

Tang, S. C. et al., "Evaluation of the Shielding Effects on Printed-Circuit-Board Transformers using Ferrite Plates and Copper Sheets," IEEE Transactions on Power Electronics, Nov. 2002, pp. 1080-1088, vol. 17, No. 6.

WIRELESS POWER ADAPTER

BACKGROUND OF THE INVENTION

1. Field of the Invention

This invention relates generally to wireless power charging.

2. Description of the Related Art

Most mobile devices use rechargeable batteries as their main energy source. The conventional way to recharge a rechargeable battery is through a wired charger which transforms alternating current (AC) power from mains electricity into suitable direct current (DC) power for charging. However, a wired charger typically requires a cable and two connectors: one to connect to the mains electricity and another to connect to the device being charged. If a user has many devices using different types of wired chargers, the mess of cables and connectors can become inconvenient and unsightly.

An alternative to wired chargers is wireless charging. In a typical wireless charging system, power flows wirelessly from a transmitter to a receiver. The transmitter has a coil(s), the receiver has a coil(s) and power is transferred due to coupling between the two coil systems. The transmitter and receiver are typically compliant with a specification (often, a published standard), so that they will work with each other and with other compliant transmitters and receivers.

Currently, although there is some standardization effort trying to harmonize different wireless power specifications in order to make transmitters and receivers interoperable, there are still multiple incompatible specifications for wireless charging systems. That is, a transmitter compliant with specification A will not operate efficiently with a receiver compliant with specification B. Two common specifications are the Qi standard by the Wireless Power Consortium (www.wirelesspowerconsortium.com) and the Rezence standard by A4WP (www.rezence.com). The drawback of having a large number of different types of wired power chargers is not significantly relieved by wireless power charging, if wireless power charging also requires a large number of different types of chargers.

SUMMARY

The present invention overcomes the limitations of the prior art by providing a wireless power adapter that can convert between different wireless power specifications. The wireless power adapter can be used to transfer power from a transmitter that is compliant with one specification (specification A) to a receiver that is compliant with a different specification (specification B). In another aspect, the wireless power adapter transfers power between transmitter and receiver that both comply with the same specification, but are otherwise incompatible with each other (e.g., incompatible form factor). The following disclosure will primarily describe power transfer between coil systems via a magnetic field, but the invention is not limited to this. For example, plates may be used to wirelessly transfer power via an electric field.

In one aspect, the wireless power adapter includes a receiver coil system, a transmitter coil system and a conversion stage. The receiver coil system is compatible with specification A and can efficiently receive wireless power transmitted by the A-compliant transmitter. The transmitter coil system is compatible with specification B and can produce wireless power to be efficiently transmitted to the B-compliant receiver. The conversion stage converts from specification A to specification B.

In one approach, the conversion stage uses direct current (DC) as an intermediate form. That is, the A-compliant wireless power is converted to DC, which is then converted to be B-compliant. In an alternative approach, the conversion may be more direct. For example, if the A and B specifications use different operating frequencies, the A operating frequency may be converted to the B operating frequency by approaches other than first converting to DC. In cases where the wireless power adapter is an active device, it may draw operating power from the incoming A-compliant wireless power.

In addition to transferring power wirelessly, many wireless power specifications also define a communications channel between transmitter and receiver, for example for purposes of handshaking, identification, control, feedback, security, configuration and/or payment. Therefore, the wireless power adapter may also include a controller system to communicate over the communications channel. If only one of the specifications includes a communications channel, then the communication may be compatible with only the one specification. If both specifications include a communications channel, then the controller system may also translate between the two specifications. In one implementation, a state machine is used to do this.

Wireless power adapters can also be used for many different purposes, and specifics of their design (including the physical form factor) will depend on the specific purpose. For example, a wireless power adapter may be implemented as a single device, with a single housing containing the receiver coil system, transmitter coil system and conversion stage. The receiver coil system and transmitter coil system may have different orientations with respect to each other, depending on the application. Each coil system may also vary in design: single coil, multiple coils, multiple overlapping coils, resonant coil system, etc.

Alternately, the receiver coil system may be contained in one housing and the transmitter coil system in another housing, with a cable attaching the two. In yet another variation, the conversion stage may be implemented as a base module, with different receiver and transmitter coil systems attachable to the base module.

Many variations are also possible for the external physical design. In many specifications or applications, the transmitter and receiver are designed to work with each other. For example, the transmitter design may specify a power charging surface, with which the receiver is compatible. There may also be corresponding alignment aids, such as pins, grooves, cradle or dock shape, or simply visual aids.

For example, consider an application where a wireless power adapter is designed to transform an A-compliant transmitter into a B-compliant transmitter. In that case, the wireless power adapter may have a surface that is compatible with the A-transmitter charging surface. It may also have a B-compatible charging surface. The adapter may be removably attachable to the A-transmitter to provide a temporary B-transmitter. Alternately, it may be permanently attachable to permanently convert the A-transmitter for operation as a B-transmitter.

This is not the only application. For example, the wireless power adapter could include multiple receiver units and/or transmitter units. This could be to allow conversion between a larger number of wireless power specifications. The wireless power adapter may be switchable between which receiver unit and which transmitter unit is activated. In one approach, the user makes this selection.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
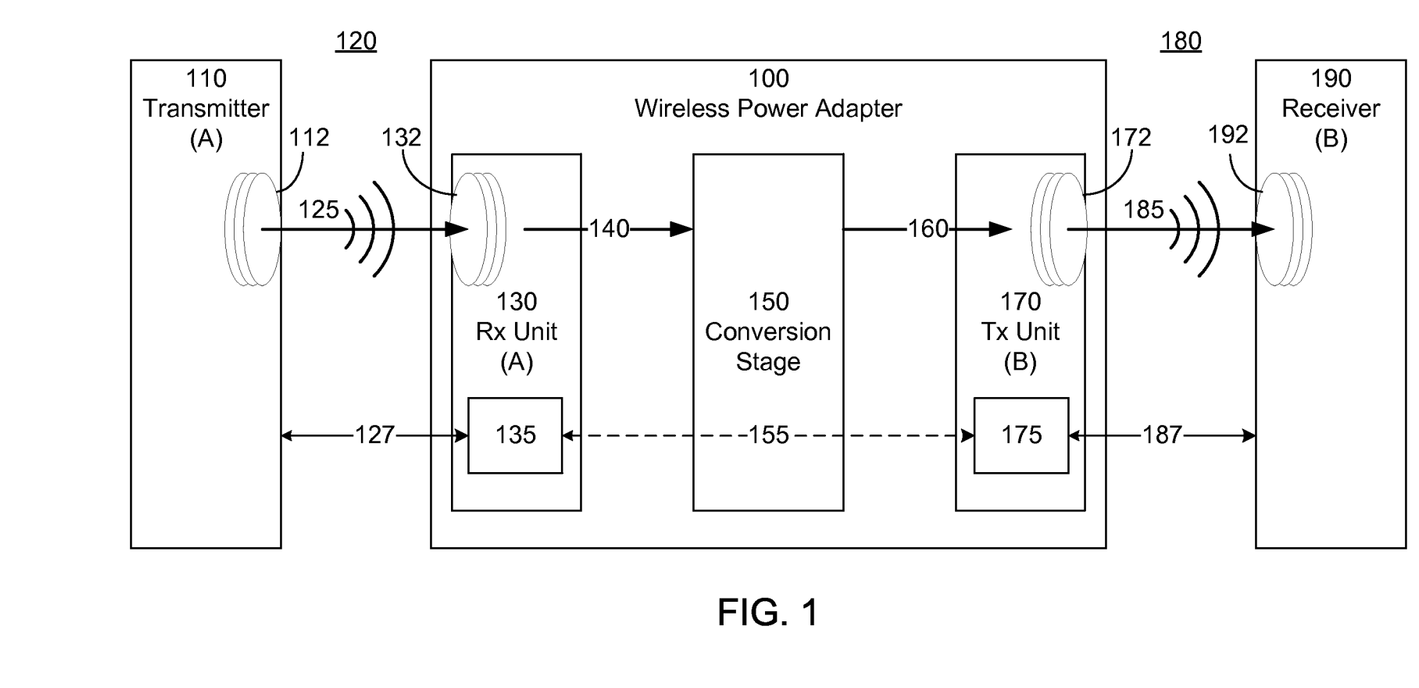
FIG. 1 is a block diagram of a system including one embodiment of a wireless power adapter according to the invention.

FIG. 1 is a block diagram of a system including one embodiment of a wireless power adapter according to the invention. The system includes a transmitter 110, a receiver 190 and a wireless power adapter 100. The transmitter 110 produces wireless power according to a specification A, and the receiver 190 can receive wireless power according to a different specification B. The A-transmitter 110 cannot efficiently transfer power to the B-receiver 190. The wireless power adapter 100 provides a link between the two.

In this example, the wireless power adapter 100 includes a receiving unit 130, a conversion stage 150 and a transmitting unit 170. The adapter 100 also includes a controller system with two controllers 135 and 175. On the receive side of the adapter, the receiving unit 130 and receive-side controller 135 form a wireless power link 120 with the A-transmitter 110. Since this is the receive side of the adapter, specification A may also be referred to as the receive specification. The wireless power link 120 includes a power channel 125 and a communications channel 127. For the power channel, the A-transmitter 110 typically converts input power (normally in DC) from an energy source into a wireless AC power signal 125. The power signal 125 could be in the form of a magnetic field, electric field or electromagnetic field. In this example, the power signal 125 is coupled to the receiving unit 130 via corresponding coil systems 112 and 132 on the transmitter and receiving unit, respectively.

In a conventional A-receiver, the receiver typically would convert the received power into a suitable form to charge the battery or directly power a device. In the wireless power adapter 100, the received wireless power is transformed to a form for re-transmission, so the receiving unit 130 may not include all of the functionality required by specification A of end-use receivers. The receiving unit 130 will be compatible with specification A, in the sense that it can efficiently receive wireless power from an A-compliant transmitter 110, but the receiving unit 130 may not be a fully A-compliant receiver.

In some wireless power specifications, including the ones shown in FIG. 1, the transmitter and receiver also exchange information. The exchanged information can be used for handshaking, identification, security, payment, configuration, power transfer control or any other purposes. In FIG. 1, this communication occurs over communications channel 127. The communication channel 127 can use any standard communication method, including WiFi, Bluetooth, NFC and RFID. Alternately, the communication channel 127 can be implemented by modulating the wireless AC power signal 125. In order to implement this communication, the transmitter 110 and wireless power adapter 100 have paired physical layers (such as paired antenna, modulator/demodulator) as well as paired logical layers (such as protocol). In the wireless power adapter, the logical layer is implemented by the receive-side controller 135.

On the transmit side of the adapter 100, the transmitting unit 170 and transmit-side controller 175 form a wireless power link 180 with the B-receiver 190. The general description of wireless power link 120 also applies to wireless power link 180. The wireless power link 180 includes a power channel 185 and a communications channel 187. The power signal 185 is coupled to the receiver 190 via corresponding coil systems 172 and 192 on the transmitting unit and receiver, respectively. In the wireless power adapter, the logical layer of the communications channel 187 is implemented by controller 175. Since the transmitting unit 170 is part of a wireless adapter, it is compatible with producing wireless power according to specification B, but it may not be fully compliant with all aspects of specification B as they relate to originating transmitters.

The conversion stage 150 bridges the two specifications A and B. The overall power channel from A-transmitter 110 to B-receiver 190 is the following: transmitter 110 via power channel 125 to receiving unit 130 to conversion stage 150 to transmitting unit 170 and via power channel 185 to transmitter 190. The receiving unit 130 typically produces an AC power signal 140, and the converter 150 converts this to an AC power signal 160 for the transmitting unit 170. To convert from power channel 125 to power channel 185 (i.e., from the A specification to the B specification), the conversion stage 150 could utilize AC-DC-AC conversion technology, AC-AC conversion technology or other suitable conversion technologies.

For the communications channels, some of the exchanged information may not be passed end-to-end between transmitter 110 and receiver 190. For example, information used to handshake between A-transmitter 110 and wireless power adapter 100 may be useful only between the transmitter 110 and controller 135, with no need to pass that information to the B-side (i.e., transmit side) of the wireless power adapter. For information that is passed end-to-end, the converter 150 also provides a translation or bridging function 155 between the two controllers 135, 175.

In an alternate embodiment, the controller system may be implemented by a single controller that provides both the receive-side and the transmit-side logical layer rather than the two controllers shown in FIG. 1. In some cases where the wireless power adapter 100 is an active device, it may be powered from the wireless power provided by the transmitter 110. The wireless power adapter 100 preferably is a standalone unit which does not require any other external power or communication signal (other than the wireless power links 120 and 180).

The wireless power adapter 100 enables the A-transmitter 110 to efficiently transfer power to the B-receiver 190, which previously was not possible due to interoperability issues between the A specification and the B specification. The function of the conversion stage 150 depends on the differences between the A specification and the B specification. Some differences between specifications may include some or all of the following:

The power channel may be based on magnetic field, electric field or electromagnetic field.

The power channel may use different operating frequencies. For example, the Qi standard uses an operating frequency ranging from 100 kHz to 205 kHz, while the Rezence standard uses an operating frequency of 6.78 MHz.

The coil systems may vary. Variations include the number of coils (e.g., single vs multiple), the size of coils, the arrangement of coils (e.g., coil-to-coil spacing, overlapping vs non-overlapping), and the activation of coils. Some coil systems use resonance, while some may not. The term "coil system" and "coil" are not meant to be limited to circular spools of wire; they are also intended to include inductors of other shapes and configurations.

Specified power levels may vary.

The communications channel may use different physical layers and/or different logical layers. The information exchanged may vary.

Physical form factors may vary.

Figure 2:
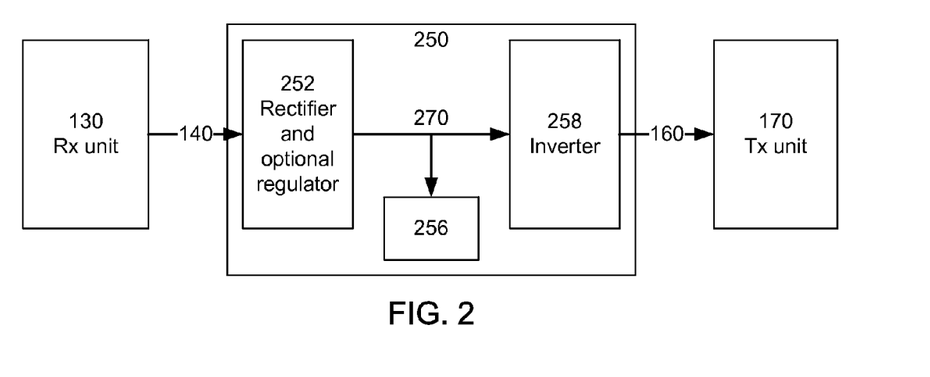
FIG. 2 is a block diagram of one embodiment of a conversion stage.

FIG. 2 is a block diagram of one embodiment 250 of a conversion stage 150. For simplicity, the communications channel and controllers are not shown in FIG. 2. This example uses AC-DC-AC technology. The conversion stage 250 converts the A-compliant wireless power to DC, and then converts from DC to B-compliant wireless power. The conversion stage includes a rectifier and optional regulator 252, an inverter 258 and an optional energy storage unit 256. The rectifier and optional regulator 252 convert the received high frequency AC power signal 140 into a DC power signal 270. An inverter 258 converts the DC power signal 270 into another high frequency AC power signal 160 which has a suitable waveform for the transmitting unit 170 and B specification.

The energy storage element 256 can be implemented in different ways. For example, it can be implemented as a capacitor with suitable value working as a filter. In this case, DC power signal 270 will have reduced ripple. Alternately, it can be implemented as a very small capacitor or even eliminated. In this case, the inverter 258 will receive a DC power signal 270 with large ripple. In another variation, the energy storage element 256 may be designed with high energy storage capacity. Examples include ultra-capacitor and battery. In this case, the wireless power adapter 100 can be charged by the A-transmitter 110, the charge can be stored in the energy storage element 256, and then the B-receiver 190 can be charged at a later time. For example, the wireless power adapter 100 can be removed from the A-transmitter 110, transported to a different location, and then used to charge the B-receiver 190.

Figure 3:
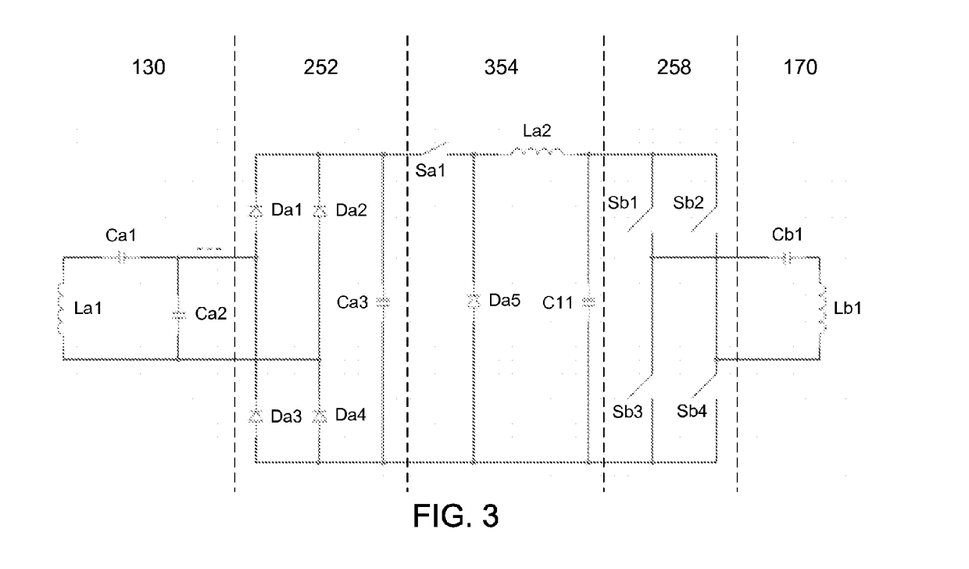
FIG. 3 is an example circuit diagram implementing the conversion stage of FIG. 2.

FIG. 3 is an example circuit diagram implementing the conversion stage of FIG. 2. La1, Ca1 and Ca2 form the receiving unit 130. Although Ca1 and Ca2 are both optional, with the receiver coil La1, they can form a resonant tank with a resonant frequency close to the operating frequency of the A specification to boost energy transfer efficiency. The received high frequency AC power signal 140 flows through the rectifier 252 formed by Da1, Da2, Da3, Da4 and Ca3. The rectifier 252 in FIG. 3 is a full-wave rectifier formed by four diodes, but other rectification technologies, e.g., half-wave rectification and synchronous rectification, may also be used. Sa1, Da5, La2 and C11 form a step-down DC-DC converter 354 to regulate the output from the rectifier 252 and provide a suitable input voltage to the inverter 258. Other regulation technologies, including step-up converters, Buck-Boost converters, and linear regulators, may also be used. This regulator can also be eliminated if the output of the rectifier is suitable for the inverter input. The inverter 258 is a full-bridge inverter formed by four switches, Sb1, Sb2, Sb3 and Sb4. Half-bridge inverters and RF amplifiers are examples of other inverter technologies. Cb1 and Lb1 form the transmitting unit 170, which transmits energy to the B-receiver via the transmitter coil Lb1.

Figure 4:
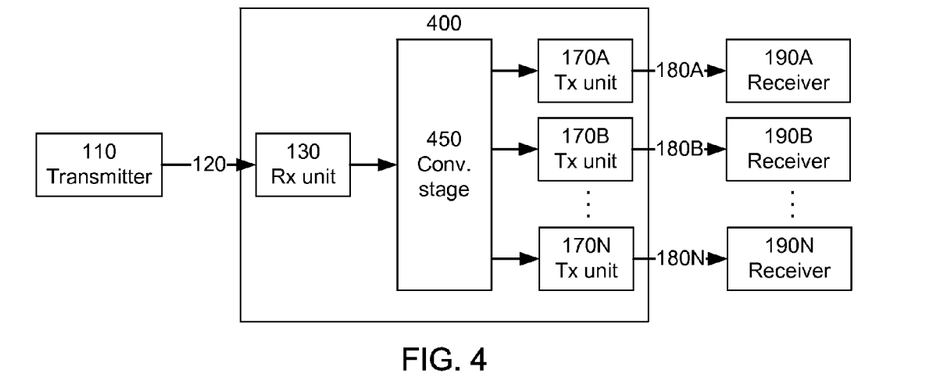
FIG. 4 is a block diagram of a wireless power adapter that couples one transmitter to multiple receivers.
Figure 5:
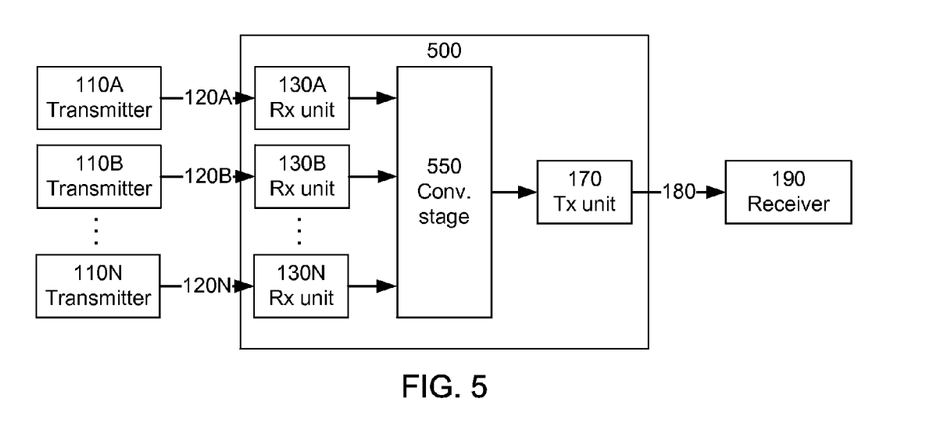
FIG. 5 is a block diagram of a wireless power adapter that couples multiple transmitters to one receiver.

FIGS. 1-3 show examples of wireless power adapters for coupling one transmitter to one receiver. FIGS. 4-5 show examples with multiple transmitters and/or receivers. FIG. 4 is a block diagram of a wireless power adapter 400 that couples one transmitter 110 to multiple receivers 190A-N. The wireless power adapter 400 includes a receiving unit 130, which receives energy wirelessly from an A-transmitter 110 through wireless power link 120. The received energy can be used to power multiple transmitting units 170A-N, each of which transmits energy wirelessly to corresponding receivers 190A-N through wireless power links 180A-N. The different receivers 190A-N and wireless power links 180A-N may use any combination of specifications: all the same specification, all different specifications, different variations of a common specification, some same and some different specifications, for example. For simplicity, a single conversion stage 450 is shown.

FIG. 5 is a block diagram of a wireless power adapter 500 that couples multiple transmitters 110A-N to one receiver 190. The wireless power adapter 500 can receive energy from multiple transmitters 110A-N through wireless power links 120A-N. The received energy is collected, combined and input to transmitting unit 170, which transmits the collected energy to receiver 190 via wireless power link 180. In this embodiment, the conversion stage 550 functions in part as an energy collector. As with FIG. 4, the wireless power links 120A-N may use various combinations of specifications.

FIGS. 4 and 5 showed one-to-many and many-to-one versions of the wireless power adapter. Many-to-many conversion can also be implemented. In addition, the multiple receiving units and/or transmitting units can be activated as needed. In FIG. 4, the conversion stage 450 may be switchable between/among the various transmitting units 170. For example, if the wireless power adapter is used to split incoming energy among several wireless power links, then energy may be directed to all wireless power links 180 which are active. Alternately, if the wireless power adapter is intended to operate as a one-to-one converter, but with the capability to convert to any of multiple possible specifications, then at any time energy is directed to only one of the transmitting units 170, but which one may be changed over time. The switching may be done automatically, or it may be user selected.

Figure 6A:
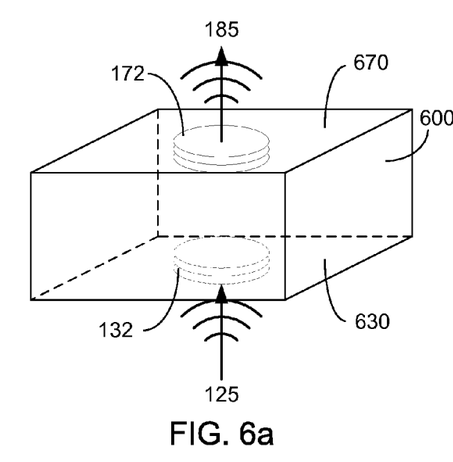
FIGS. 6a-6c are perspective views of wireless power adapters implemented as a single device.

Wireless power adapters can also be implemented in different physical form factors. The form factor will depend on the application. FIG. 6a is a perspective view of a wireless power adapter implemented as a single device. In this example, the receiver coil system 132, transmitter coil system 172 and conversion stage 150 (not shown) are all contained within a single housing 600. The receiver coil system 132 is located proximate to bottom surface 630, which is designed to interface to the charging surface of the A-transmitter 110. Analogously, transmitter coil system 172 is located proximate to top surface 670, which is a charging surface compliant with the B specification. Electronics implementing the conversion stage 150 and other parts of the receiving unit 130 and transmitting unit 170 may be located on a printed circuit board contained within housing 600. In the example of FIG. 6a, the receiver coil system 132 and transmitter coil system 172 are laterally aligned with each other, and the receive and transmit power channels 125 and 185 propagate in collinear directions. This is not required.

Figure 6B:
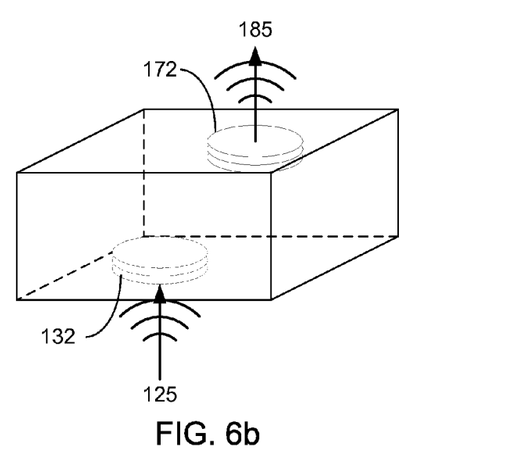
Figure 6C:
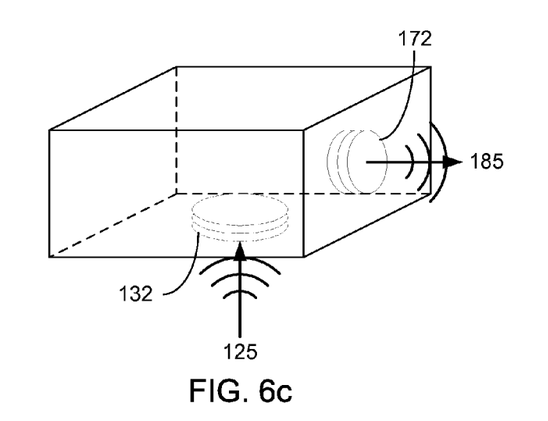

In FIG. 6b, the receiver coil system 132 and transmitter coil system 172 are laterally offset from each other. The power channels 125 and 185 are also laterally offset, although they are propagating in parallel directions. In FIG. 6c, the wireless power adapter changes the direction of the wireless power link, for example if the transmitter 110 and receiver 190 have incompatible orientations. The receiver coil system 132 is oriented to receive a power signal 125 propagating along a vertical direction, while the transmitter coil system 172 produces a power signal 185 propagating along a horizontal direction.

Figure 7A:
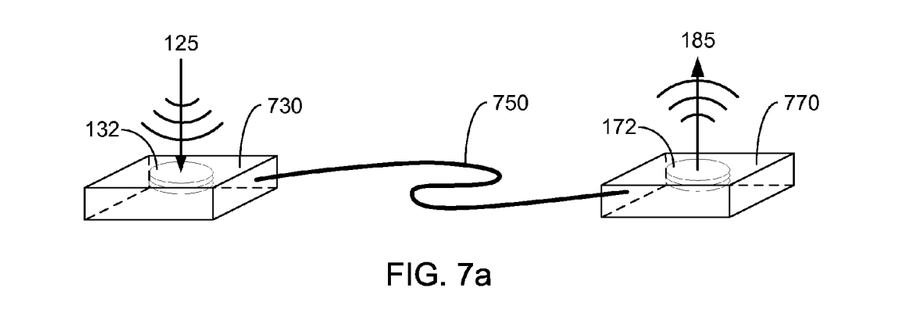
FIGS. 7a-7b are perspective views of wireless power adapters with coil systems connected by cables.

FIG. 7a shows an implementation in which the receiver coil system 132 and transmitter coil system 172 are contained in separate housings 730, 770 connected by a cable 750. This allows more flexibility in placement of the coil systems. The conversion stage 150 may be located in either housing. Alternately, it may be contained in a separate housing 700, as shown in FIG. 7b.

Figure 7B:
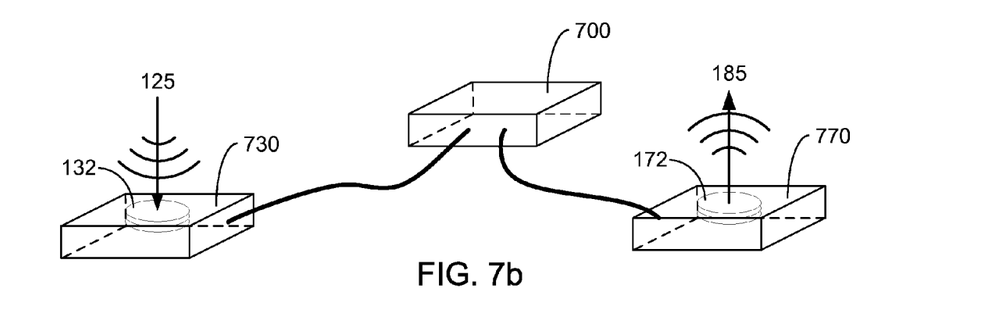

FIGS. 6-7 show various implementations with permanently connected receiver coil systems and transmitter coil systems. However, these can also be implemented in a modular fashion. For example, in FIG. 7b, the housings 730, 770 may be detachable from the base module 700. The base module 700 may include connectors to accommodate different types of coil systems and specifications. This increases the flexibility of base module 700. Similarly, the single housing 600 of FIG. 6a may be implemented as three detachable components: one with receiver coil system 132, one with transmitter coil system 172 and one with the conversion stage 150. Different coil systems may then be attached to the base module with conversion stage 150.

Figure 8:
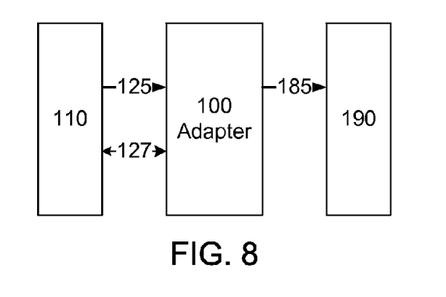
FIG. 8 is a block diagram illustrating use of a wireless power adapter as a hardware key.

FIG. 8 shows another embodiment, in which the wireless power adapter 100 serves as a hardware key to establish a wireless power link between the transmitter 110 and the receiver 190. In some cases, even if the transmitter 110 and receiver 190 comply with the same specification, the transmitter 110 may not transfer power to the receiver 190 because the transmitter 110 is secured or implements conditional access which the receiver cannot satisfy the conditional access requirement. Applications could include a transmitter installed in a private space where the use of the transmitter is proprietary or a transmitter installed in a public space where the use of the transmitter requires payment or other access conditions.

The wireless power adapter 100 provides the conditional access, thus unlocking the transmitter 110. The required proprietary information is exchanged between the transmitter 110 and the wireless power adapter 100 through the communications channel 127. After correctly receiving the exchanged proprietary information, the transmitter 110 acknowledges the identity of the wireless power adapter and starts energy transfer 125 to the wireless power adapter 100. The wireless power adapter 100 relays this energy 185 to the receiver 190. Coding, encryption and/or any other data security method can be part of the exchanged proprietary information. Security information, including keys, can be pre-stored in the wireless power adapter, or input into the wireless power adapter before use, or downloaded to the wireless power adapter from a server, for example. In some cases, the security information may be checked not only before energy transfer but also during energy transfer. The security information can also be set to have a limited lifetime. After the lifetime, the wireless power link 125 becomes invalid, and energy transfer stops.

Figure 9:
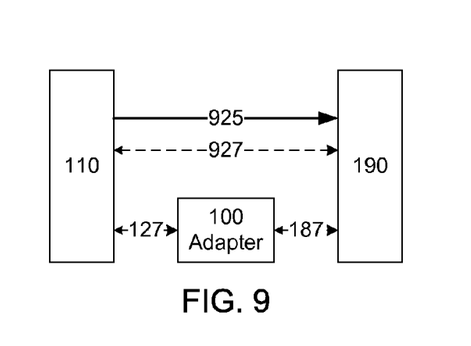
FIG. 9 is a block diagram illustrating another use of a wireless power adapter as a hardware key.

FIG. 9 shows a case in which the wireless power adapter 100 serves only to provide the security information, without being a part of the energy transfer between the transmitter 110 and receiver 190. As in FIG. 8, the receiver 190 cannot get energy from the transmitter 110 because it does not have the proper access. The wireless power adapter 100 provides the access. Proprietary information is exchanged between the transmitter 110 and wireless power adapter 100 through communications channel 127. After correctly receiving the exchanged proprietary information, transmitter 110 establishes the wireless power link 925 and starts energy transfer directly from transmitter 110 to receiver 190 without going through the wireless power adapter 100. Subsequent communication between the transmitter 110 and receiver 190 may be direct via communications channel 927, or it may be indirect via the wireless power adapter 100 and communications channels 127 and 187.

Although the detailed description contains many specifics, these should not be construed as limiting the scope of the invention but merely as illustrating different examples and aspects of the invention. It should be appreciated that the scope of the invention includes other embodiments not discussed in detail above. For example, while most of the disclosure describes the wireless power adapter in the context of converting between different specifications, it could also be used to address other incompatabilities between transmitter 110 and receiver 190. For example, the wireless power adapters shown in FIGS. 6 and 7 could be used if the transmitter and receiver had incompatible orientations or positions, even if they complied with the same specification. Similarly, the wireless power adapters shown in FIGS. 8 and 9 could be used with transmitter and receivers that comply with the same specification.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A wireless power adapter for converting wireless power received according to a first receive specification to wireless power transmitted according to a first transmit specification, the wireless power adapter comprising:
   a receiver coil system adapted to receive wireless power compliant with the first receive specification;
   a transmitter coil system adapted to transmit wireless power compliant with the first transmit specification, wherein the first transmit specification is different from the first receive specification; and
   a conversion stage coupling the receiver coil system to the transmitter coil system, the conversion stage converting wireless power received by the receiver coil system, the conversion from the first receive specification to the first transmit specification for transmission by the transmitter coil system.

2. The wireless power adapter of claim 1 further comprising a housing, the housing containing the receiver coil system, the conversion stage and the transmitter coil system.

3. The wireless power adapter of claim 1 further comprising:
   a first housing containing the receiver coil system;
   a separate second housing containing the transmitter coil system; and
   an electrical cable connecting the first and second housings.

4. The wireless power adapter of claim 1 further comprising a housing containing the receiver coil system, the housing removably attachable to a transmitter that produces wireless power compliant with first receive specification.

5. The wireless power adapter of claim 1 further comprising a housing containing the receiver coil system, the housing permanently attachable to a transmitter that produces wireless power compliant with the first receive specification.

6. The wireless power adapter of claim 1 further comprising a surface located proximate to the receiver coil system, the surface compatible with a charging surface of a transmitter that produces wireless power compliant with the first receive specification.

7. The wireless power adapter of claim 1 further comprising a charging surface located proximate to the transmitter coil system, the charging surface compatible with the first transmit specification.

8. The wireless power adapter of claim 1 wherein the receiver coil system contains multiple receiver coils.

9. The wireless power adapter of claim 1 wherein the receiver coil system contains a resonant coil system.

10. The wireless power adapter of claim 1 wherein the transmitter coil system contains multiple transmitter coils.

11. The wireless power adapter of claim 1 further comprising:
   a second transmitter coil system adapted to transmit wireless power compliant with a second transmit specification; the conversion stage further coupling the receiver coil system to the second transmitter coil system, the conversion stage converting wireless power received by the receiver coil system, the conversion from the first receive specification to the second transmit specification for transmission by the second transmitter coil system.

12. The wireless power adapter of claim 1 further comprising:
   a second receiver coil system adapted to receive wireless power compliant with a second receive specification; the conversion stage further coupling the second receiver coil system to the transmitter coil system, the conversion stage converting wireless power received by the second receiver coil system, the conversion from the second receive specification to the transmit specification for transmission by the transmitter coil system.

13. The wireless power adapter of claim 1 wherein the conversion stage first converts the wireless power compliant with the first receive specification to DC, and then converts from DC to wireless power compliant with the first transmit specification.

14. The wireless power adapter of claim 1 wherein the conversion stage converts the wireless power compliant with the first receive specification to wireless power compliant with the first transmit specification, without a conversion to DC.

15. The wireless power adapter of claim 1 wherein at least one of the first receive specification and the first transmit specification includes a communications channel, and the wireless power adapter further comprises a controller system to communicate over the communications channel.

16. The wireless power adapter of claim 15 wherein the communications channel communicates by modulating transmission of the wireless power.

17. The wireless power adapter of claim 1 wherein the first receive specification includes a first receive communications channel, the first transmit specification includes a first transmit communications channel, and the wireless power adapter further comprises a controller system to communicate over the communications channels and to convert between the communications channels.

18. The wireless power adapter of claim 1 wherein the first transmit specification and the first receive specification specify different operating frequencies for wireless power transmission.

19. The wireless power adapter of claim 1 wherein both the first transmit specification and the first receive specification are published standards.

20. The wireless power adapter of claim 1 wherein at least one of the first transmit specification and the first receive specification is a Wireless Power Consortium standard.

21. The wireless power adapter of claim 1 wherein at least one of the first transmit specification and the first receive specification is an A4WP standard.

22. A wireless power adapter for converting wireless power received according to a first receive specification to wireless power transmitted according to a first transmit specification, the wireless power adapter comprising:
   a receiving unit adapted to receive from a transmitter wireless power compliant with the first receive specification;
   a transmitting unit adapted to transmit to a receiver wireless power compliant with the first transmit specification, wherein the receiver is incompatible with the transmitter; and
   a conversion stage coupling the receiving unit to the transmitting unit, the conversion stage converting wireless power received by the transmitting unit to a form that is transmitted by the transmitting unit and is compatible with the receiver.

23. The wireless power adapter of claim 22 wherein the first transmit specification is the same as the first receive specification.

24. The wireless power adapter of claim 23 wherein the transmitter and receiver have incompatible orientations.

25. The wireless power adapter of claim 23 wherein the transmitter implements conditional access to transmit wireless power and the receiver cannot satisfy the conditional access requirement.

26. The wireless power adapter of claim 22 wherein the wireless power is transferred by one of magnetic field, electromagnetic field or electric field.

* * * * *